(12) United States Patent
Lee et al.

(10) Patent No.: US 8,248,719 B2
(45) Date of Patent: Aug. 21, 2012

(54) CAMERA MODULE

(75) Inventors: Chai-Wei Lee, Taipei Hsien (TW); Hou-Yao Lin, Taipei Hsien (TW); Sheng-Jung Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 209 days.

(21) Appl. No.: 12/752,152

(22) Filed: Apr. 1, 2010

(65) Prior Publication Data

US 2011/0080662 A1    Apr. 7, 2011

(30) Foreign Application Priority Data

Oct. 7, 2009   (CN) ........................... 2009 1 0308080

(51) Int. Cl.
*G02B 7/02*    (2006.01)

(52) U.S. Cl. ..................................................... 359/823
(58) Field of Classification Search ................. 359/699, 359/704, 823
See application file for complete search history.

(56) References Cited

U.S. PATENT DOCUMENTS

2005/0063695 A1* 3/2005 Kameyama ................... 396/144
* cited by examiner

*Primary Examiner* — Joseph P Martinez
(74) *Attorney, Agent, or Firm* — Altis Law Group, Inc.

(57) ABSTRACT

An exemplary camera module includes a barrel and a holder. The holder includes an accommodating space defined therein. The barrel is received in the accommodating space of the holder. Independent grooves are formed in one of the outer cylindrical surface of the barrel and the inner cylindrical surface the holder. Stripe-shaped protrusions are formed on the other of the outer cylindrical surface of the barrel and the inner cylindrical surface the holder. Each stripe-shaped protrusion is engaged in a respective groove.

7 Claims, 3 Drawing Sheets

CAMERA MODULE

BACKGROUND

1. Technical Field

The present disclosure relates to optical imaging, and particularly to a camera module.

2. Description of Related Art

A typical fixed-focus camera module includes a holder and a barrel. In assembly, the barrel is inserted in the holder and is completely fixed with the holder via an adhesive. Accordingly, in operation, it is impossible to achieve focusing. Sometimes, the image taken by the fixed-focus camera module may be unclear.

Therefore, a new camera module is desired to overcome the above-mentioned problem.

BRIEF DESCRIPTION OF THE DRAWINGS

Many aspects of the present embodiment can be better understood with reference to the following drawings. The components in the drawings are not necessarily drawn to scale, the emphasis instead being placed upon clearly illustrating the principles of the present embodiment. Moreover, in the drawings, like reference numerals designate corresponding parts throughout the several views.

DETAILED DESCRIPTION

An embodiment will now be described in detail below with reference to the drawings. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
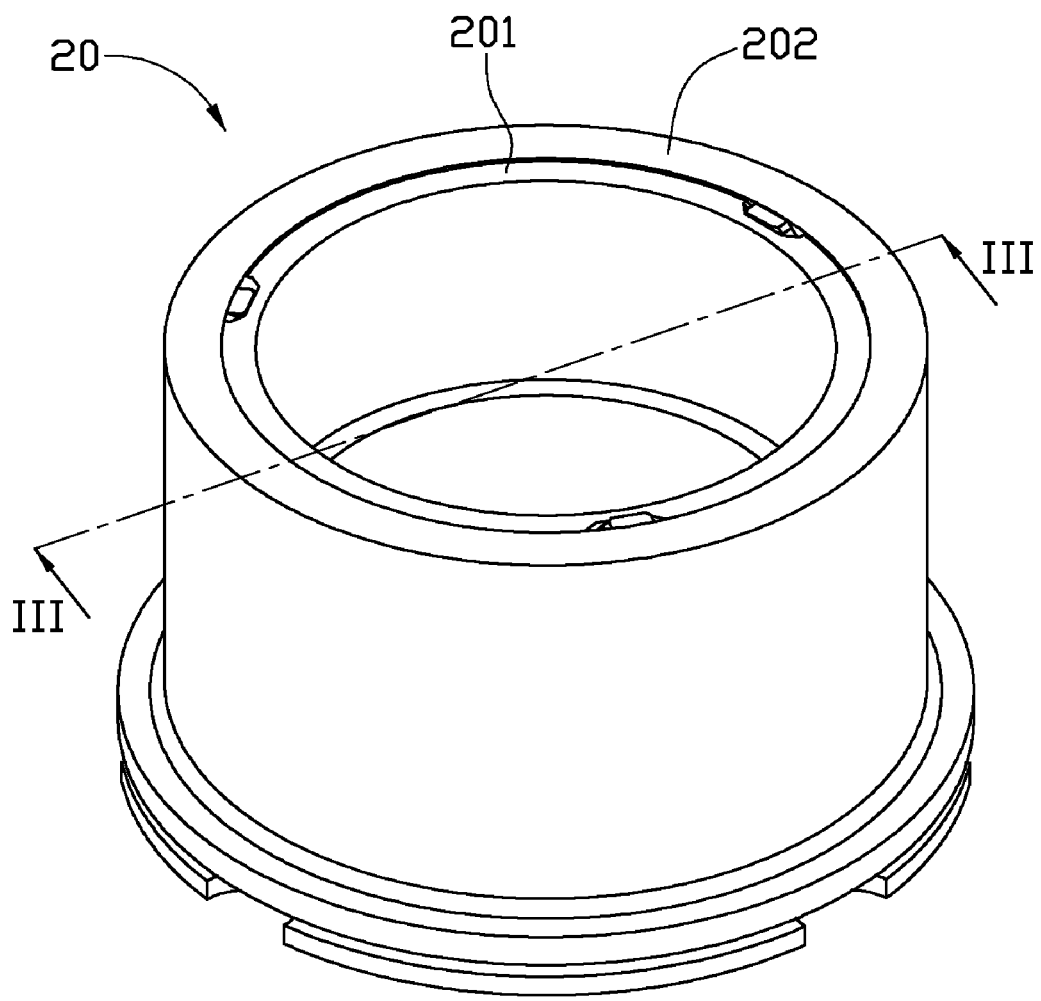
FIG. 1 is an assembled perspective view of a camera module according to an exemplary embodiment.
Figure 2:
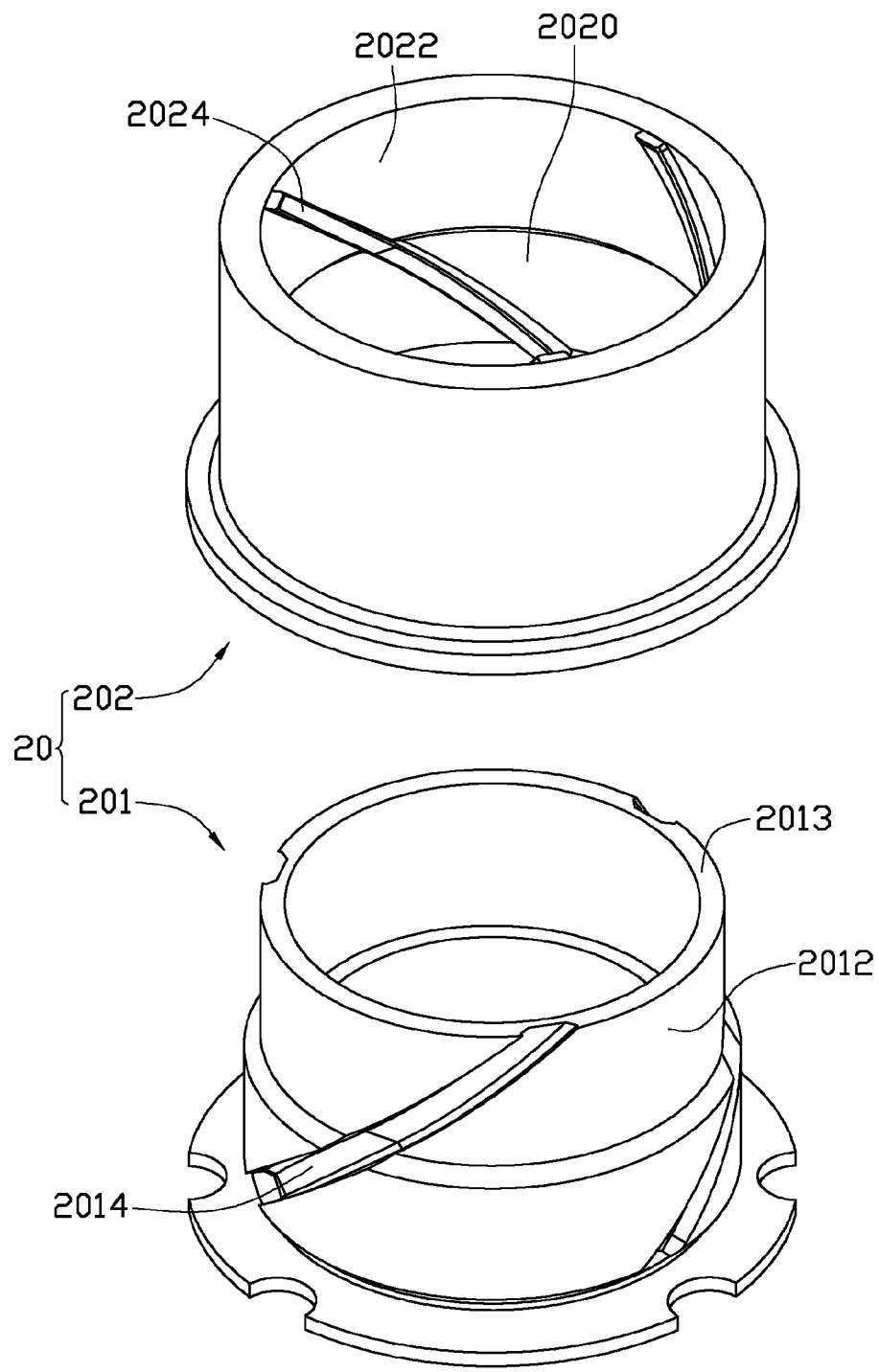
FIG. 2 is an exploded perspective view of the camera module of FIG. 1.
Figure 3:
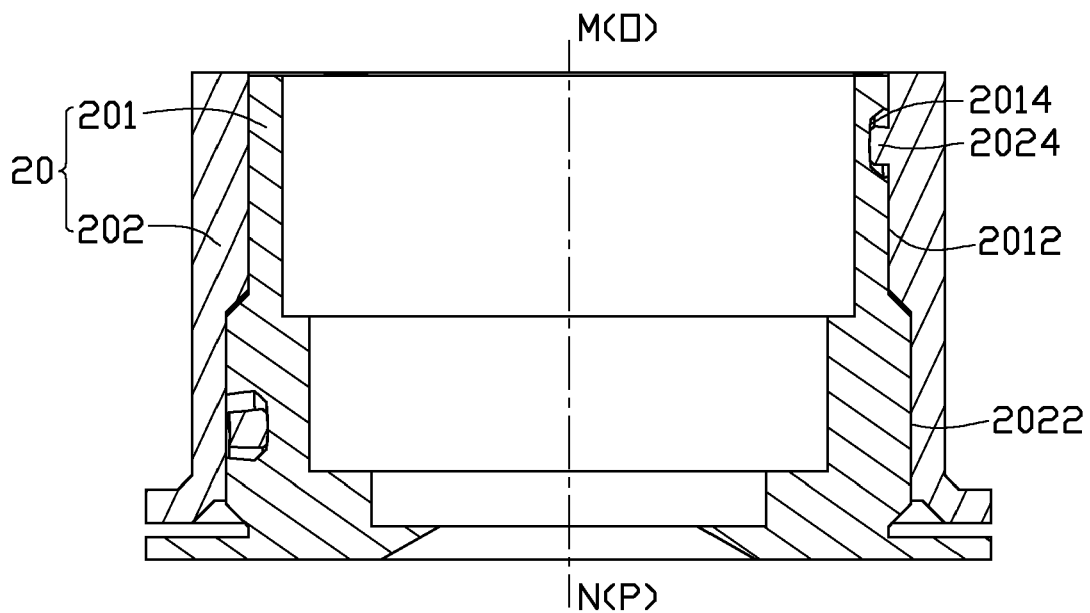
FIG. 3 is a sectional view of the assembled camera module of FIG. 1 taken along the line III-III.

Referring to FIGS. 1-3, a camera module 20 according to an exemplary embodiment is shown. The camera module 20 includes a barrel 201, a holder 202, and a plurality of optical elements (e.g., lenses; not shown) received in the barrel 201.

The barrel 201 is substantially a stepped cylinder. In other embodiments, the barrel 201 can be substantially a cylinder. The barrel 201 includes a central axis MN, and a plurality of grooves 2014 defined in the outer cylindrical surface 2012. In the present embodiment, the barrel 201 includes three grooves 2014. The three grooves 2014 are evenly distributed on the outer cylindrical surface 2012. The grooves 2014 are independent from each other. Each groove 2014 extends obliquely relative to the central axis MN from an end surface 2013 at a first end of the barrel 201 to an opposite second end of the barrel 201 along the outer cylindrical surface 2012.

The grooves 2014 are equidistant from each other on any cross section perpendicular to the central axis MN. Each groove 2014 is projected along the central axis MN of the barrel 201 to form an arc on a projection plane perpendicular to the central axis MN, and a central angle the arc subtends is less than 180 degrees.

The holder 202 has a central axis OP, a plurality of strip-shaped protrusions 2024 formed on the inner cylindrical surface 2022, and an accommodating space 2020. The accommodating space 2020 is a stepped through hole. In alternative embodiments, the accommodating space 2020 can be a cylindrical hole. In the present embodiment, the holder 202 includes three strip-shaped protrusions 2024. Each protrusion 2024 is configured for engaging with a respective groove 2014. The accommodating space 2020 is for partially receiving the barrel 201. The protrusions 2024 are equidistant from each other on any cross section perpendicular to the central axis OP. Each protrusion 2024 is projected along the central axis OP of the holder 202 to form an arc on a projection plane perpendicular to the central axis OP, and a central angle the arc subtends is less than 180 degrees.

After the barrel 201 is coupled to the holder 202, the complete outer cylindrical surface 2012 contacts the whole inner cylindrical surface 2022. Accordingly, it is less likely that the barrel 201 will tilt relative to the holder 202 in assembly.

In assembly, one end of each groove 2014 is aligned with one end of a corresponding strip-shaped protrusion 2024, the barrel 201 is rotated relative to the holder 202 until the barrel 201 is screwed into a proper position. In operation, the barrel 201 can be rotated relative to the holder 202 to achieve focusing.

In other embodiments, the total number of the recesses 2014 is not limited to three, and can be e.g., two, four. The plurality of recesses 2014 can be uniformly arranged on the outer cylindrical surface 2012, or symmetrical about the central axis MN of the barrel 201. The total number and the configuration of the protrusions 2024 depends on the number and the configuration of recesses 2014.

It is to be understood that in alternative embodiments, the recesses 2014 can be formed in the inner cylindrical surface 2022 of the holder 202, and the strip-shaped protrusions 2024 can be formed on the outer cylindrical surface 2012 of the barrel 201.

While certain embodiment have been described and exemplified above, various other embodiment from the foregoing disclosure will be apparent to those skilled in the art. The present disclosure is not limited to the particular embodiment described and exemplified but is capable of considerable variation and modification without departure from the scope and spirit of the appended claims.

What is claimed is:

1. A camera module comprising:

a barrel comprising a plurality of discrete grooves defined in the outer cylindrical surface thereof, each groove obliquely extending from a first end of the barrel to an opposite second end of the barrel; and a holder comprising an accommodating space defined therein, and a plurality of discrete elongated protrusions formed on the inner cylindrical surface thereof, the barrel being received in the accommodating space of the holder, each protrusion engaged in a respective groove;

wherein the barrel comprises a first central axis, each groove is projected along the first central axis of the barrel and forms a first arc on a projection plane perpendicular to the first central axis, a central angle the first arc subtends is less than 180 degrees; and wherein the holder comprises a second central axis, each protrusion is projected along the second central axis of the holder and forms a second arc on a projection plane perpendicular to the second central axis, a central angle the second arc subtends is less than 180 degrees.

2. The camera module of claim 1, wherein the protrusions are uniformly arranged on the inner cylindrical surface of the holder.

3. The camera module of claim 1, wherein the grooves are uniformly distributed on the outer cylindrical surface of the barrel.

4. The camera module of claim 1, wherein the holder comprises a central axis, and the protrusions are equidistant from each other on any cross section perpendicular to the central axis.

5. The camera module of claim 1, wherein the barrel comprises a central axis, and the grooves are equidistant from each other on any cross section perpendicular to the central axis.

6. The camera module of claim 1, wherein the barrel is one of a cylinder and a stepped cylinder.

7. The camera module of claim 1, wherein the accommodating space is one of a stepped through hole and a cylindrical hole.

* * * * *